No. 873,055. PATENTED DEC. 10, 1907.
G. LAKE.
VEHICLE TOP SUPPORT.
APPLICATION FILED DEC. 17, 1906.
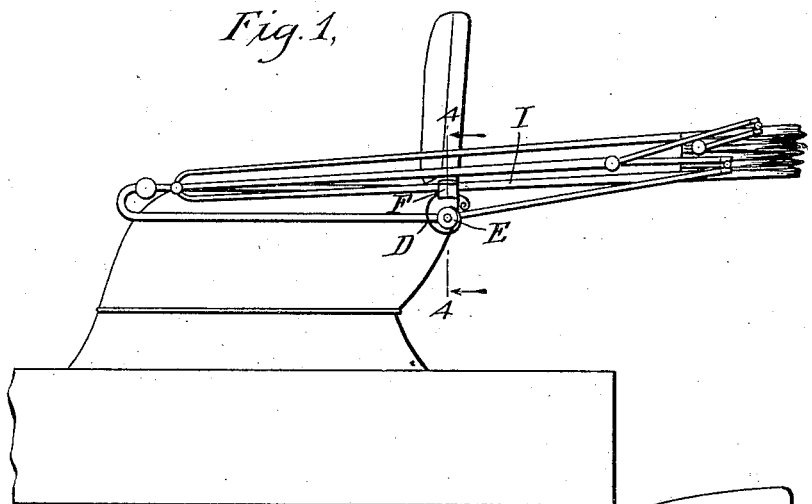
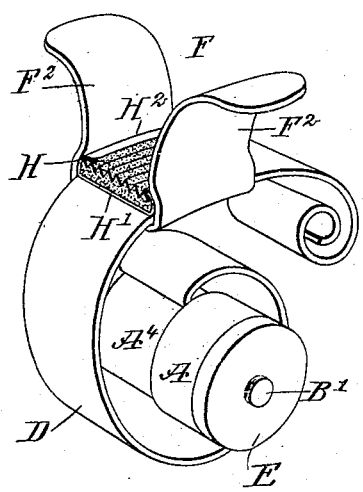
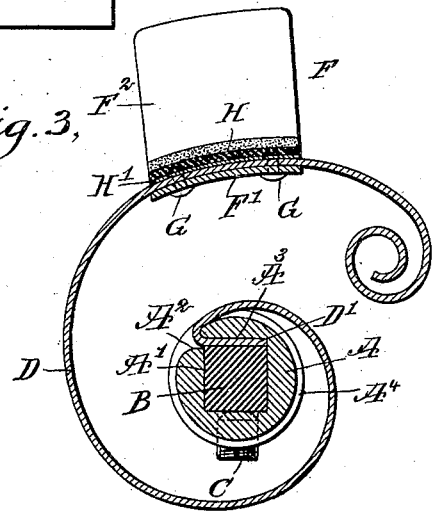
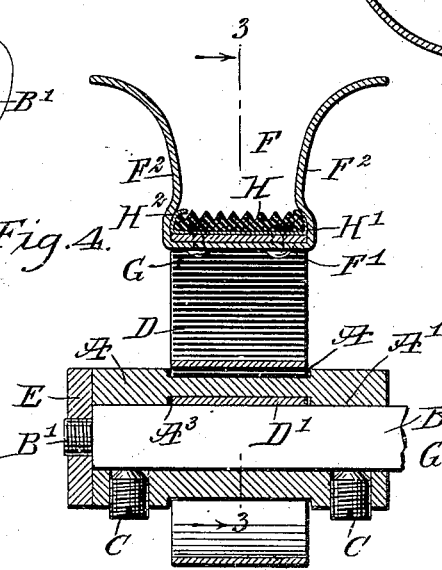
WITNESSES
Edward Thorpe
Theo. G. Hoster
INVENTOR
Golladay Lake
BY Munn & Co
ATTORNEYS

UNITED STATES PATENT OFFICE.

GOLLADAY LAKE, OF MEMPHIS, TENNESSEE.

VEHICLE-TOP SUPPORT.

No. 873,055.  Specification of Letters Patent.  Patented Dec. 10, 1907.

Application filed December 17, 1906. Serial No. 348,191.

*To all whom it may concern:*

Be it known that I, GOLLADAY LAKE, a citizen of the United States, and a resident of Memphis, in the county of Shelby and State of Tennessee, have invented a new and Improved Vehicle-Top Support, of which the following is a full, clear, and exact description.

The invention relates to buggy top prop attachments such as shown and described in the application for Letters Patent of the United States, No. 300,439, granted to me February 10, 1906.

The object of the present invention is to provide a new and improved vehicle top support, which is simple and durable in construction, and arranged to yieldingly support a folded vehicle top with a view to relieve the said top and vehicle body of all undue jar and jostle, thus giving more comfort to the occupants of the vehicle.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied to a buggy; Fig. 2 is a perspective view of the improvement; Fig. 3 is a sectional side elevation of the same on the line 3—3 of Fig. 4, and Fig. 4 is a transverse section of the same on the line 4—4 of Fig. 1.

The sleeve A of the vehicle top support is provided with a polygonal bore A' fitting onto the correspondingly shaped top prop stud B of the buggy or other vehicle on which the support is used, and the said sleeve A is adapted to be fastened in place on the stud B by set screws C or other suitable fastening devices. The sleeve A is provided with a transversely extending slot $A^2$ leading to an interior socket $A^3$ formed in one side of the bore A', as plainly indicated in Figs. 3 and 4, and the said socket $A^3$ is adapted to receive the angular end D' of a curved spring D, preferably of volute form and extending through the slot $A^2$ and fitting into a portion of an annular recess $A^4$ formed externally on the sleeve A, so that the side edges of the spring D abut against the shoulders formed by the recess $A^4$. Now when the spring D is in position on the sleeve A, then the latter can be readily slipped over the stud B and fastened in place thereon by screwing up the set screw C. In order to hold the sleeve A against downward sliding movement on the stud B, a washer E is provided, screwing on the reduced threaded end B' of the stud B and against the outer end of the sleeve A, as plainly illustrated in the drawings.

Near the free end of the spring D is held a clip F, preferably approximately U-shape in cross section and having its bottom or middle portion F' fitting the under side of the spring B, the said bottom F' being fastened by rivets G or other fastening devices to the spring D.

Between the side flanges $F^2$ of the clip F is arranged a lining H of rubber or other suitable material, and this lining H is attached to a metallic holder H', riveted or otherwise fastened to the top of the spring D, as indicated in Figs. 2, 3 and 4. The holder H' has its side flanges $H^2$ bent down onto the lining, to securely hold the latter in place on the holder H'. The side flanges $F^2$ are slightly bent inwardly at their lower portions onto the side edges of the lining H, so as to assist in holding the latter securely in position. The side flanges $F^2$ of the clip F are curved outwardly so as to permit the ready entrance of the bow I of the top of the vehicle, as plainly illustrated in Fig. 1, it being understood that by the arrangement described the bow I, by resting on the lining H of the spring D, is yieldingly supported by the resilient action of the spring and at the same time the bow I is held against lateral as well as upward movement by the spring side flanges of the clip F. Thus from the foregoing it will be seen that when the vehicle top is in a folded position as illustrated in Fig. 1, the bow I fits snugly into the clip F and is yieldingly supported by the spring D securely fastened in position on the sleeve A attached to the stud B of the vehicle.

The device shown and described is very simple and durable in construction, and can be readily fastened in place on the stud B, or removed therefrom whenever it is desired to do so for repairs or other purposes.

Having thus described my invention, I claim as new and desire to secure by Letters Patent:

1. A vehicle top support, comprising a sleeve having a polygonal bore to fit a correspondingly shaped top prop stud, and provided with a socket in one wall of the bore, a peripheral recess and a slot of a length equal to that of the recess and leading into the socket, a volute spring having an angular end extending through the slot in the sleeve into the socket thereof, said spring being of a width equal to the width of the recess of the sleeve, screws projecting into the bore of the sleeve at the side opposite the socket, an approximately U-shaped clip having its middle portion fitting the under side of the spring near the free end thereof and secured thereto, and a lining secured upon the spring between the flanges of the clip, the lower portions of the flanges of the clip being bent inwardly onto said lining.

2. In a vehicle to support the combination with a top prop stud, of a sleeve having a bore fitting the top prop stud, and provided with a socket in one wall of the bore and a slot leading from said socket, a volute spring having an angular end fitting in the socket of the sleeve, an approximately U-shaped clip secured to the spring near its free end, and screws in the sleeves at the side opposite the socket of the bore thereof, whereby the sleeve will be secured to the top prop stud and the spring secured in the socket of said sleeve.

3. In a vehicle to support, a curved spring, means for securing one end of the spring to the top prop stud, an approximately U-shaped clip having its middle portion engaging the under side of the spring, near the free end thereof and secured to the same, a lining of rubber or the like, and a plate to which the lining is secured, said plate being secured to the upper face of the spring between the flanges of the clip and having its ends bent upon the said lining, the lower portions of the flanges of the clip being bent inwardly into engagement with the bent ends of the said lining carrying plate.

4. A vehicle top support comprising a sleeve having a polygonal bore fitting the correspondingly shaped top prop stud, the sleeve having a transversely extending slot terminating in a socket formed in one of the side walls of the said bore, a curved spring extending through the said slot and having a bent end fitting the said socket, a clip approximately U-shape in cross section and having its bottom engaging the under side of the spring at the free end thereof, means for securing the said clip bottom to the said spring, and a lining of rubber secured to the top of the spring between the side flanges of the said clip.

5. A vehicle top support comprising a sleeve for attachment to the top prop stud and having an external annular recess, from which leads a transverse slot to the polygonal bore of the sleeve, one side wall of the said bore having a socket leading to the said slot, and a curved spring extending through the said slot and having an angular terminal engaging the said socket, the width of the spring corresponding approximately to the width of the said sleeve recess, the free end of the spring being adapted to receive and support a bow of the vehicle top.

In testimony whereof I have signed my name to this specification in the presence of two subscribing witnesses.

GOLLADAY LAKE.

Witnesses:
   THEO. G. HOSTER,
   EVERARD B. MARSHALL.